E. & G. WESTFALL.
LOCKING MECHANISM FOR STEERING APPARATUS.
APPLICATION FILED FEB. 18, 1918.
1,277,800.
Patented Sept. 3, 1918.
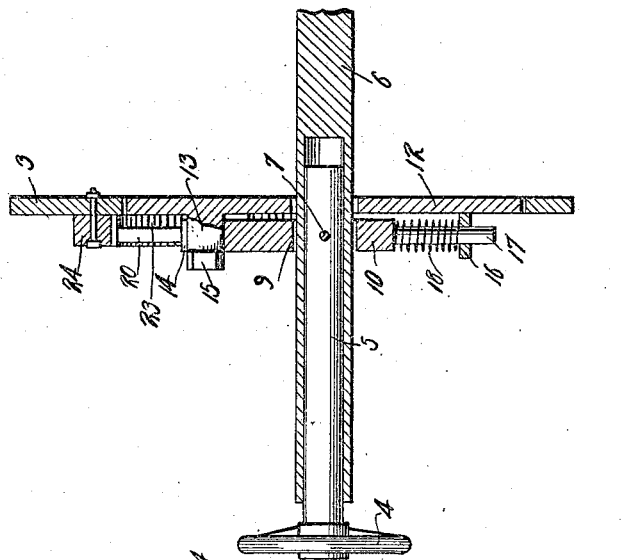
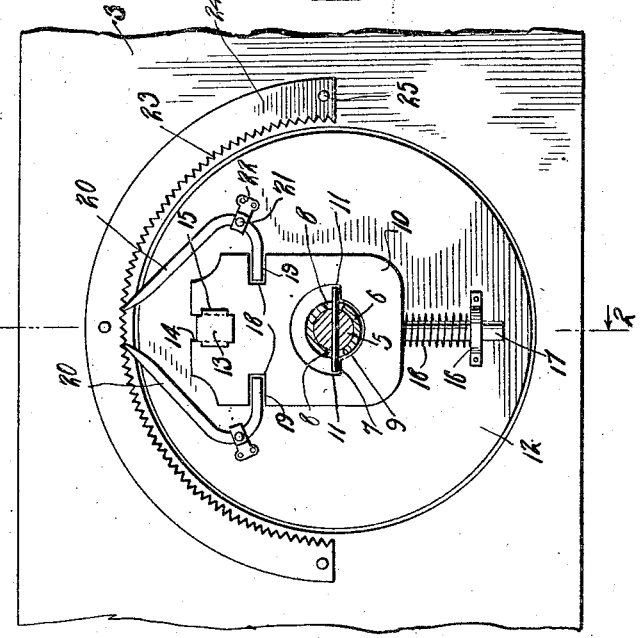
INVENTOR.
Edwin Westfall
and George Westfall
WITNESSES
BY
ATTORNEY

UNITED STATES PATENT OFFICE.

EDWIN WESTFALL AND GEORGE WESTFALL, OF VINTON, OHIO.

LOCKING MECHANISM FOR STEERING APPARATUS.

1,277,800.  Specification of Letters Patent.  Patented Sept. 3, 1918.

Application filed February 18, 1918. Serial No. 217,870.

*To all whom it may concern:*

Be it known that we, EDWIN WESTFALL and GEORGE WESTFALL, citizens of the United States, residing at Vinton, in the county of Gallia and State of Ohio, have invented certain new and useful Improvements in Locking Mechanism for Steering Apparatus, of which the following is a specification.

Our invention relates to a control or lock for the steering wheels of automobiles, trucks and other self-propelled vehicles. The primary object of the invention is to provide a device which is operable upon the driver releasing the steering wheel, to lock and hold the steering wheel at the angle or position at which it was released. Such a construction enables the driver to release the steering wheel when desired, in order to rest the hands and arms in order to relieve the muscles thereof of the usual strain.

In accomplishing the said objects, we provide the novel construction, arrangement and combination of parts hereinafter described and claimed with relation to one preferred embodiment which is shown in accompanying drawings, of which:—

Figure 1 is a view showing my improvements applied to a dash-board fragment and to a steering post, the latter being shown in section, and Fig. 2 is a sectional view on the line 2—2 of Fig. 1.

Referring specifically to the drawings, our improvements are associated with the usual dash-board 3, and a steering wheel 4, a steering rod 5 and the steering post 6. These parts are to be taken as conventional and diagrammatic since they are employed in practically all types of self-propelled vehicles as part of the steering mechanism. Rod 5 turns in the post 6 to an extent limited by a pin 7 which extends through the rod and through arcuate elongated slots 8 in the post 6.

Post 6 extends through an opening 9 of a slidable plate 10. Opening 9 has lateral extensions 11 into which the extremities of the pin 7 extend as shown in Fig. 1. Slide 10 moves radially to a limited extent upon the face of a fixed plate 12, and the pin 7 of rod 5 does not turn post 6 until rod 5 has first turned and moved the slide 10 inwardly. Projecting from the plate 12 is a stud 13 which extends through an opening 14 of the plate, thus serving to prevent turning of the plate. Stud 13 also has projections 15 which overlap the plate and prevent movement thereof toward the steering wheel 4. Also extending from the plate 12, is a bearing 16 in which a stem 17 of the slide 10 is slidably mounted. This stem is surrounded by an expansive coil spring 18 which engages the bearing 16 and also the slide 10. Oppositely disposed in the sides of the slide 10 are notches or recesses 18 into which the ends 19 of the pawls 20 extend. The pawls 20 are pivoted at 21 to suitable brackets 22 secured to the plate 12. Said pawls 20 engage the teeth 23 of a segment plate 24 secured by means of screws 25 through the dash-board 3.

In operation, upon turning the steering wheel 4 and the rod 5, said parts will turn independently of the post 6, which directly steers. This independent movement of the rod 5 due to the provision of the pin 7 which extends into the slot extensions 11, slides the plate 10 inwardly and tilting the pawls 20 at the ends 19 and retracting them so that the plate 12 may freely turn. This retraction of the plate 10 is against the tension of the spring 18. Thus after the wheel 4 has been brought to the proper position and released, the spring 18 will slide the plate 10 to its original position, accordingly turning the pins 11, rod 5 and wheel 4 slightly, and causing the pawls 20 to engage appropriate teeth of the series 23, to thus lock the steering mechanism. Obtaining this object, the operator of the vehicle, may rest the muscles of his hands and arms, particularly relieving them of unnecessary strain. The plate 10 will slide upon turning of the steering wheel in either direction, and the pawls 20 will move in the same manner regardless of the direction.

Since merely one preferred embodiment of the invention has been illustrated and described, it is to be understood that changes in details of construction may be resorted to without departing from the spirit and scope of the invention.

We claim:—

1. In combination with steering mechanism, a slidable head, said head having a slot, said steering mechanism having a pin extending into said slot to slide the head through turning movement of the mechanism, and means to lock the steering mechanism, against accidental movement controlled through movement of the head.

2. In combination with steering mechanism, a post, a rod mounted in said post and having a pin extending laterally therefrom through a horizontally enlarged slot of the post, said post extending through a plate, and a head, said head having a laterally enlarged slot, said pin extending into said slot, a stem extending from said head, a bearing for said stem on said plate, a spring intermediate said bearing and head to urge the head away from said bearing, a stud rising from said plate, said head having a slot into which said stud extends, a pawl pivoted to said plate, said head having a recess into which said pawl extends, and a toothed member with which said pawl coöperates, to prevent accidental movement of the steering mechanism.

3. In combination with steering mechanism, a post, an operating rod mounted therein having a pin extending laterally therefrom, through an enlarged slot of the post, a dash board, a plate slidably mounted thereon, being actuated by movement of the pin with the steering post, a toothed member, a pair of pawls engaging said member, and said pawls being actuated by movement of the sliding plate.

4. In combination with steering mechanism, a post, an operating rod mounted therein having a pin extending laterally therefrom, through an enlarged slot of the post, a dash board, a plate slidably mounted thereon, through which the post extends, said plate having notches adapted to receive said pin, a pair of pawls pivotally mounted on said dash board, a pair of recesses provided in said plate to receive the ends of the pawls, and a toothed member with which the said pawls engage, to prevent accidental movement of the steering post.

In testimony whereof we affix our signatures in presence of two witnesses.

EDWIN WESTFALL.
GEORGE WESTFALL.

Witnesses:
LEVI WESTFALL,
J. P. WESTFALL.

Copies of this patent may be obtained for five cents each, by addressing the "Commissioner of Patents, Washington, D. C."